United States Patent Office 3,376,638
Patented Apr. 9, 1968

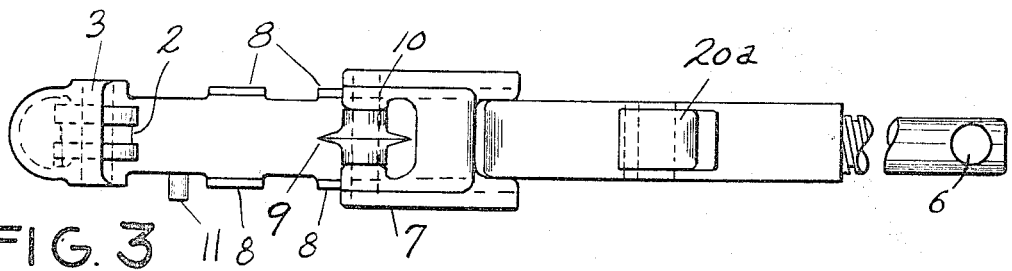
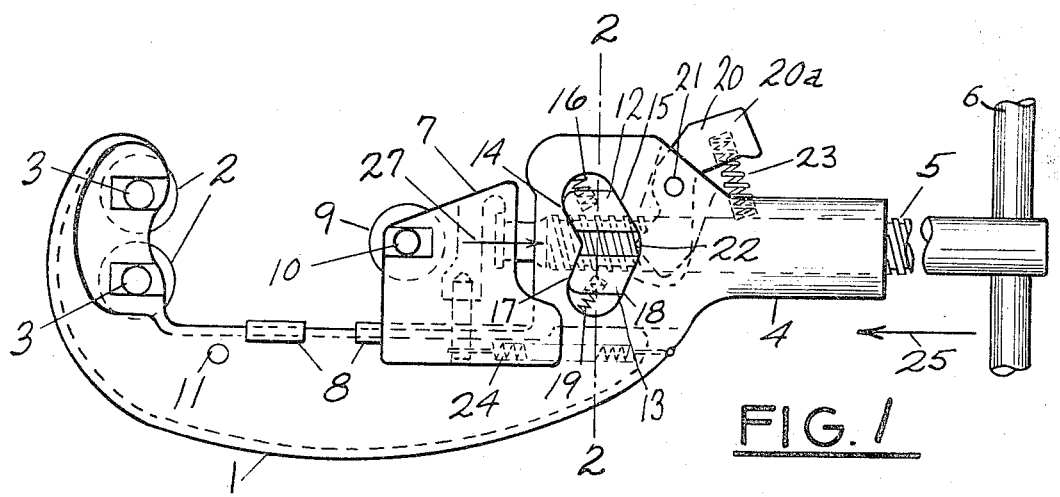
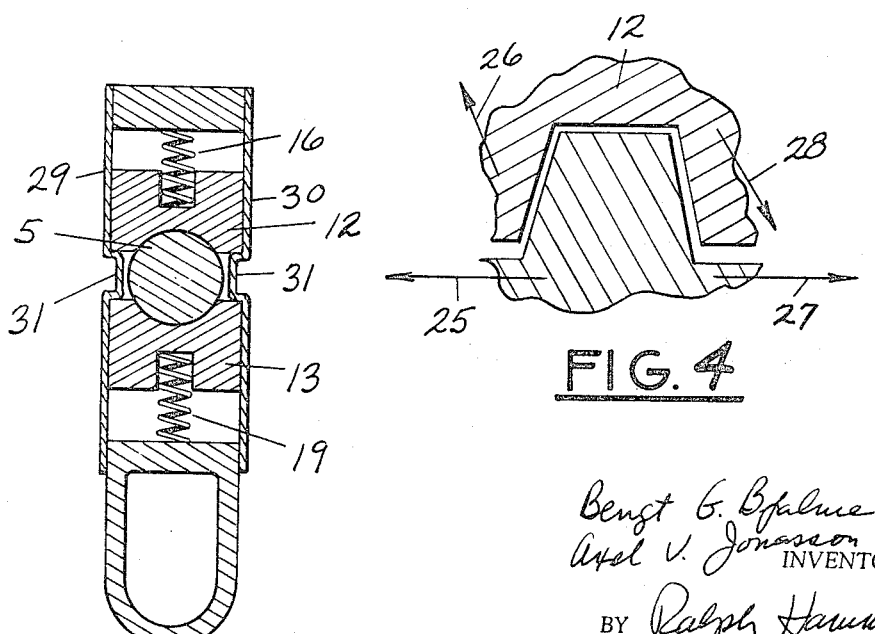

3,376,638
PIPE CUTTER HAVING HALF NUT GUIDED FOR MOVEMENT TOWARD AND AWAY FROM THE PRESSURE SCREW
Bengt G. Bjalme and Axel V. Jonasson, Erie, Pa., assignors to Reed Manufacturing Company, Erie, Pa., a corporation of Pennsylvania
Filed Mar. 30, 1966, Ser. No. 538,748
4 Claims. (Cl. 30—102)

ABSTRACT OF THE DISCLOSURE

The pressure screw of a pipe cutter cooperates with a half nut guided in a way having a surface presented toward the pipe and making an acute angle with the axis of the pressure screw and engaging one side of the nut to hold the nut against the screw under forces tending to move the screw away from the pipe and having another surface spaced from the first surface and presented away from the pipe and making an obtuse angle with the axis of the pressure screw and engaging the other side of the nut for moving the nut away from the pressure screw under forces tending to move the screw toward the pipe. For heavy duty applications, a pair of half nuts may be used on opposite sides of the pressure screw.

---

This invention is a heavy duty pipe cutter which is quickly set to different sizes and in which the pressure screw need be turned only to apply cutting pressure.

In the drawing, FIG. 1 is a side elevation of a pipe cutter with the cover plates removed, FIG. 2 is a section on line 2—2 of FIG. 1, FIG. 3 is a top plan view, and FIG. 4 is a diagrammatic view indicating the forces between the pressure screw and one of the split nuts.

The common parts of the cutter are readily identified, 1 being the frame having at one end guide rolls 2 journaled on pins 3 and having at the other end a hub 4 slidably receiving a pressure screw 5 rotated by a handle 6 and in pressure transmitting relation to a carriage 7 guided on slides 8 on the frame and carrying a cutter wheel 9 journaled on a pin 10. The guide rolls 2 cradle the pipe on an axis perpendicular to the plane of the cutter wheel 9 and the pipe is cut by relative rotation between the cutter and pipe while applying pressure through the pressure screw. A stop pin 11 limits the forward travel of the carriage so as to keep the cutter wheel 9 clear of the guide rolls 2. The parts so far described are or may be of common construction and may differ substantially in appearance from the specific structure shown.

In the conventional cutter, both the forward and backward movement of the carriage is effected by rotation of the pressure screw. This time consuming adjustment is required at the end of each cut and when changing to different size pipe. This is avoided by the use of releasable half nuts for the pressure screw. Two half nuts 12 and 13 are shown respectively engaging the upper and lower sides of the pressure screw. The nuts are identical. The upper nut 12 is slidably carried in a way having inclined front and back wedge surfaces 14 and 15. A light compression spring 16 urges the nut downward against the upper side of the pressure screw. The lower nut 13 is slidable in a way having inclined front and back wedge surfaces 17 and 18 urged against the lower side of the pressure screw by a light compression spring 19. The inclined surfaces 17, 18 are axially displaced from the surfaces 14, 15 a distance equal to one half the pitch of the threads of the pressure screw 5 so the lower nut 13 will properly register with the threads of the pressure screw.

The half nuts can be released from the pressure screw by pushing down on the outer end 20a of a lever 20 pivoted at 21 on the frame and having a cam faced inner end 22 extending between the half nuts 12 and 13 and normally held out of contact with the nuts by a compression spring 23. When the outer end 20a of the lever is pushed downward, the cam faced end 22 of the lever spreads the half nuts apart and moves them out of contact with the pressure screw. This releasing movement is relatively easy since only the force of light springs 16 and 19 need be overcome. When the half nuts 12, 13 are released from the pressure screw, a tension spring 24 between the frame and the carriage 7 retracts the carriage and moves the cutting wheel to a wide open position in which the cutter can be arranged on any size pipe. The cutting wheel can be advanced against the pipe by merely pushing inward on the handle 6 on the outer end of the pressure screw. This exerts a force along the axis of the pressure screw in the direction of arrow 25. Since the inclined surfaces 14 and 17 diverge or make an obtuse angle to the axis of the pressure screw, the force indicated by arrow 25 causes the half nuts 12, 13 to be moved away from the threads of the pressure screw. This action is diagrammatically indicated for the nut 12 in FIG. 4 where the nut 12 is moved outward away from the threads of the pressure screw in the direction of arrow 26. As soon as the inward movement of the cutting wheel is stopped, the springs 16 and 19 move the half nuts against the pressure screw and further advance of the cutting wheel into the pipe is obtained by turning the pressure screw in the usual manner. The pressure exerted on the pressure screw by the cutting wheel acts along the axis of the pressure screw in the direction of arrow 27. Since the inclined surfaces 15 and 18 converge or make an acute angle to the axis of the pressure screw, the force indicated by arrow 27 causes the half nuts 12 and 13 to be moved inward against the pressure screw, thereby holding the threads of the half nuts in tight engagement with the threads of the pressure screw. This inward movement of the half nut 12 is diagrammatically indicated in FIG. 4 by the arrow 28.

Since the cutter is designed for heavy duty use, two half nuts 12, 13 are shown. For lighter duty use, only a single half nut need be used. The half nuts 12, 13 are held in place by cover plates 29, 30, each having a projection 31 extending between the half nuts.

In the use of the cutter, the pipe to be cut is cradled on the rolls 2 and the handle 6 of the pressure screw is pushed inward, bringing the cutting wheel 9 into engagement with the outer surface of the pipe. The handle 6 is then turned to develop the desired cutting pressure which is maintained until the cut is completed. The outer end 20a of the release lever is then pushed downward, camming the half nuts 12, 13 out of engagement with the pressure screw and permitting the carriage 7 to be returned to the full open position by the spring 24. At no time is it necessary to manually open the cutter or back off the pressure screw by turning the handle 6.

What is claimed as new is:

1. A pipe cutter having a frame with means for guiding the cutter for relative rotation with respect to the pipe in a plane perpendicular to the longitudinal axis of the pipe, a wheel having a cutting edge in said plane, means mounting the wheel on the frame for movement toward and away from the pipe, a pressure screw in thrust relation to said mounting means, a first half nut engaging one side of the pressure screw, said frame having a first way slidably receiving the first nut, said first way having a first surface presented toward the pipe and making an acute angle with the axis of the pressure screw and engaging one side of the first nut for holding the nut against the screw under forces tending to move the screw away from the pipe, said first way having a second surface spaced from the first surface and presented away from the pipe and making an obtuse angle with the axis of the pressure screw and engaging the other side of the first nut for moving the nut away from the pressure screw under forces tending to move the screw toward the pipe.

2. The cutter of claim 1 having spring means for biasing the mounting means away from the pipe, and a lever for moving the half nut away from the pressure screw to release the mounting means.

3. The cutter of claim 1 in which the frame has a second way slidably receiving a second half nut engaging a side of the pressure screw opposite the first half nut, said second way having a first surface presented toward the pipe and making an acute angle with the axis of the pressure screw and engaging one side of the second nut for holding the nut against the screw under forces tending to move the screw away from the pipe, said second way having a second surface spaced from the first surface and presented away from the pipe and making an obtuse angle with the axis of the pressure screw and engaging the other side of the second nut for moving the nut away from the pressure screw under forces tending to move the screw toward the pipe.

4. The cutter of claim 3 having spring means for biasing the mounting means away from the pipe, and a lever for moving the half nuts away from the pressure screw to release the mounting means.

References Cited

UNITED STATES PATENTS

| | | | |
|---|---|---|---|
| 1,505,205 | 8/1924 | Kilgans | 30—102 |
| 2,071,756 | 2/1937 | Manville | 30—102 |
| 3,100,934 | 8/1963 | Jonasson | 30—102 |
| 2,582,406 | 1/1952 | Bachli et al. | 30—102 |
| 3,145,469 | 8/1964 | Petersen | 30—102 |

MYRON C. KRUSE, *Primary Examiner.*